United States Patent
Chauvin et al.

(10) Patent No.: US 10,545,942 B2
(45) Date of Patent: Jan. 28, 2020

(54) QUERYING AND PROJECTING VALUES WITHIN SETS IN A TABLE DATASET

(71) Applicant: International Business Machines Corporation, Armonk, NY (US)

(72) Inventors: Stanley L. Chauvin, Gatineau (CA); Roch Lefebvre, Gatineau (CA); Graham A. Watts, Ottawa (CA); Qing Wei, Manotick (CA)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 15/180,121

(22) Filed: Jun. 13, 2016

(65) Prior Publication Data
US 2017/0357677 A1 Dec. 14, 2017

(51) Int. Cl.
*G06F 16/00* (2019.01)
*G06F 16/22* (2019.01)
*G06F 16/248* (2019.01)
*G06F 16/2455* (2019.01)

(52) U.S. Cl.
CPC ........ *G06F 16/2282* (2019.01); *G06F 16/248* (2019.01); *G06F 16/2455* (2019.01)

(58) Field of Classification Search
CPC .......... G06F 17/245; G06F 17/30563; G06F 17/246; G06F 17/30498; G06F 17/30539; G06F 17/30554; G06F 17/30572; G06F 17/30905; G06F 21/6227; G06F 16/2282; G06F 16/2455; G06F 16/248; G06F 3/0482
See application file for complete search history.

(56) References Cited

U.S. PATENT DOCUMENTS

| | | | |
|---|---|---|---|
| 7,761,782 B1 | 7/2010 | Warren et al. | |
| 8,136,031 B2 | 3/2012 | Massand | |
| 8,595,231 B2 | 11/2013 | Arends et al. | |
| 8,775,433 B2 * | 7/2014 | Green | G06F 17/2264 707/741 |
| 8,892,501 B2 | 11/2014 | Bruland et al. | |
| 9,274,773 B2 * | 3/2016 | Vickers | G06F 8/51 |
| 9,449,062 B2 | 9/2016 | Latzina | |
| 9,582,171 B2 | 2/2017 | Pourshahid | |
| 9,734,181 B2 * | 8/2017 | Wang | G06F 16/2282 |

(Continued)

FOREIGN PATENT DOCUMENTS

| | | |
|---|---|---|
| CN | 102541903 A | 7/2012 |
| WO | 0157744 A2 | 8/2001 |

OTHER PUBLICATIONS

Dalvi; "Microsoft Excel: Splitting One Cell Row into Multiple Rows"; Tech-Recipes; Nov. 29, 2013; 6 pages; <http://www.tech-recipes.com/rx/45005/microsoft-excel-splitting-one-cell-row-into-multiple-rows/>.

(Continued)

*Primary Examiner* — Merilyn P Nguyen
(74) *Attorney, Agent, or Firm* — Marcus Walker (57) ABSTRACT

Embodiments of the present invention provide systems and methods for visualizing and querying data. Data subsets within an original table are examined. Values within the data subsets are extracted. Based on the extracted values, a new table is generated. The data contents of the original table differ from the data contents of the new table. Thus, the resulting visualization of the original table differs from the resulting visualization of the new table.

17 Claims, 4 Drawing Sheets

(56) References Cited

U.S. PATENT DOCUMENTS

| | | | |
|---|---|---|---|
| 10,176,160 B2* | 1/2019 | Hirzel | G06F 17/246 |
| 2003/0165254 A1* | 9/2003 | Chen | G06F 16/29 |
| | | | 382/103 |
| 2009/0276692 A1* | 11/2009 | Rosner | G06F 17/30498 |
| | | | 715/227 |
| 2010/0306223 A1* | 12/2010 | Lee | G06F 16/24578 |
| | | | 707/759 |
| 2011/0022629 A1 | 1/2011 | Glover | |
| 2012/0150899 A1* | 6/2012 | Minton | G06F 16/84 |
| | | | 707/769 |
| 2014/0040182 A1* | 2/2014 | Gilder | G06F 17/2264 |
| | | | 707/602 |
| 2015/0186504 A1* | 7/2015 | Gorman | G06F 16/24522 |
| | | | 707/752 |
| 2015/0186808 A1* | 7/2015 | Petitclerc | G06Q 10/067 |
| | | | 705/7.36 |
| 2015/0370776 A1* | 12/2015 | New | G06F 17/248 |
| | | | 715/234 |
| 2017/0052766 A1* | 2/2017 | Garipov | G06F 8/34 |
| 2017/0286386 A1* | 10/2017 | Goto | G06F 17/245 |

OTHER PUBLICATIONS

Geng; "Table Normalization (Parse comma separated fields into individual records)"; asked Jun. 20, 2011; edited Oct. 12, 2012; 3 pages; <http://stackoverflow.com/questions/6418214/table-normalization-parse-comma-separated-fields-into-individual-records>.

Mike; "Excel split cell containing multiple values"; Jul. 2, 2012; 6 pages; <http://pressf1.pcworld.co.nz/showthread.php?123148-Excel-split-cell-containing-multiple-values>.

Sqljason; "Converting a single comma separated row into multiple rows"; May 20, 2010; 10 pages; <http://sqljason.com/2010/05/converting-single-comma-separated-row.html>.

"SAP HANA Text Analysis Developer Guide"; SAP HANA Platform SPS 11; Document Version: 1.1—Mar. 29, 2016; pp. 1-30.

* cited by examiner

QUERYING AND PROJECTING VALUES WITHIN SETS IN A TABLE DATASET

BACKGROUND OF THE INVENTION

The present invention relates generally to the field of operations managements, and more specifically to visualizing and querying data.

Analytic tools are increasingly able to consume a single table of data as a spreadsheet or comma-separated values (CSV) file and performs out of the box analytics. CSV files store tabular data (numbers and text) in plain text format, wherein each line of the file is a data record comprising of one or more fields separated by commas. These analytical tools may rapidly provide a solution on the simple datasets to an end-user. The end-user is typically a business organization which is analyzing datasets of interest to the business organization. These solutions are able to consume only a single table of data, which contains single values in each column for each row.

SUMMARY

According to one embodiment of the present invention, a method for visualizing and querying data is provided, the method comprising the steps of: extracting, by one or more processors, a first set of data from a plurality of data within a first table; identifying, by one or more processors, a second set of data, wherein the second set of data comprises a plurality of values associated with the first set of data within the first table; generating, by one or more processors, a second table based on the first table; and outputting, by one or more processors, a visualization using columns, based on an analysis of the second table.

Another embodiment of the present invention provides a computer program product for visualizing and querying data, based on the method described above.

Another embodiment of the present invention provides a computer system for visualizing and querying data, based on the method described above.

DETAILED DESCRIPTION

Not all data can be easily represented using a data setup of a single table of data, which contains single values in each column for each row. Thus, business data solutions rely on a more comprehensive enterprise resource planning (ERP) solution. ERP solutions are more flexible but may take considerable time and skills to setup. Embodiments of the presentation invention as described below allows instances which require a data setup more complex than a traditional one cell, one value approach, without the need for an ERP solution.

ERP is business process management software which allows an organization to use a system of integrated applications to manage the business and automate many back office functions related to technology, services, and human resources. ERP software integrates all facets of an operation, including product planning, development, manufacturing, sales, and marketing. ERP software typically consists of multiple enterprise software modules which are individually purchased, based on software modules which best meet the specific needs and technical capabilities of the organization. Each ERP module is focused on one area of business processes, such as product development or marketing. A business can use ERP software to manage back-office activities and tasks including the following: performing distribution process management; analyzing supply chain management; improve accuracy of financial data; facilitating better project planning; automating employee life-cycles; standardizing critical business procedures; reducing redundant tasks within an organization; assessing business needs of an organization; perform accounting and financial applications; lower purchasing costs; and manage human resources and payrolls. The basic goal of using an ERP is to provide a single central repository for all information, which is shared by all various ERP facets in order to improve the flow of data across an organization using the ERP software. Data sources in ERP software search systems include information stored in many different containers such as e-mail servers, application databases, content management systems, file systems, intranet sites, and external Web sites. Enterprise search systems typically do not search the public Internet. Rather, potential data sources are contained within the organization's own private corporate network or on the inside of a firewall. ERP solutions allow a modeler to define schema and provide solutions on these defined schema.

EPR solutions are difficult to create and typically require experts to do the modelling. Some embodiments of the present invention recognize the following potential problems and/or potential areas for improvement with respect to the current state of the art of EPR software: (i) customization of EPR software can be problematic to setup; (ii) compared to the best-of-breed approach, ERP can be seen as meeting an organization's lowest common denominator needs and thus force the organization to find workarounds to meet unique demands (i.e., unique demands may not be met in an efficient or optimal manner); (iii) re-engineering of business processes to fit the ERP system may damage competitiveness or divert focus from other critical activities; (iv) cost of ERP may prove to more expensive than less integrated or less comprehensive solutions; (v) the integration of truly independent businesses can create unnecessary dependencies; (vi) extensive training requirements, which are needed to learn ERP, may take resources away from daily operations; and (vii) harmonization of ERP systems with existing organizational systems may be prove to be a time consuming and expensive endeavor.

Figure 1:
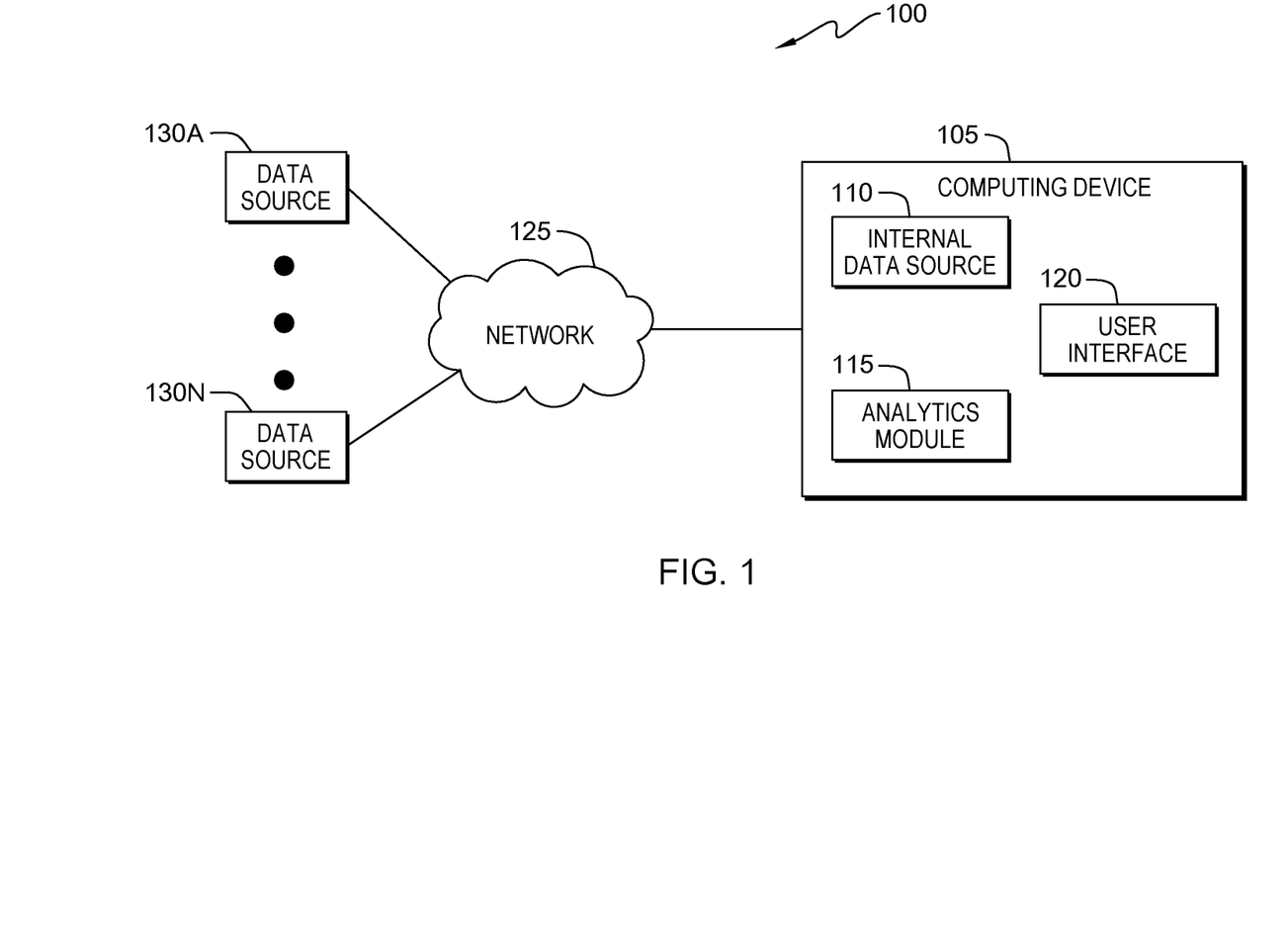
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes data sources 130A-N and computing device 105, interconnected via network 125. N may equal 2 or a higher number depending on the number of data sources which are external to computing device 105 and are connected to network 125.

Network 125 can be, for example, a local area network (LAN), a wide area network (WAN) such as the Internet, or a combination of the two, and can include wired, wireless, or fiber optic connections. In general, network 125 can be any combination of connections and protocols that will support communication between computing device 105 and data sources 130A-N.

Data sources 130A-N are electronic forms of data in text and numeric form. Data sources 130A-N may include (but are not limited to) data in word processor and spreadsheet formats. Data sources 130A-N can communicate with any additional programmable electronic devices not pictured in FIG. 1 via network 125. Data sources 130A-N may be located on their own computing device. Data processing environment 100 may include any number of data sources which can be supported and processed by the system. Internal data source 110 is an electronic form of data in text and numeric form which internally resides in computing device 105.

Computing device 105 includes internal data source 110, analytics module 115, and user interface 120. Computing device 105 may be a laptop computer, a tablet computer, a netbook computer, a personal computer (PC), a desktop computer, a personal digital assistant (PDA), a smart phone, a thin client, or any programmable electronic device capable of communicating with data sources 130A-N via network 125. Computing device 105 may include internal and external hardware components, as depicted and described in further detail with respect to FIG. 4.

User interface 120 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 120 is capable of receiving data, user commands, and data input modifications. User interface 120 is also capable of communicating with analytics module 115. In some embodiments, user interface 120 may be integrated with analytics module 115.

In this exemplary embodiment, analytics module 115 is an application capable of consuming and utilizing sets of values in columns of a table. Analytics module 115 compiles the information extracted from a text data source. The text data source includes (but is not limited to) data in word processor and spreadsheet formats. The text data source can be located internally (i.e., internal data source 110) and/or externally (i.e., data sources 130A-N). In other embodiments, multiple internal text data sources may be present. Algorithms are used by analytics module 115 to perform the following functionalities: (i) extracting a sample of rows from a dataset; (ii) identifying columns in the sample, which contain values fitting a linguistic pattern indicating a set of values; (iii) splitting apart the set of values for each such identified column into individual values; (iv) ensuring that a sufficient number of the individual values exist in the specific column for a preset threshold of number of rows for each such identified column; (v) creating a separate table with two columns where one column identifies the row of the original table (or primary key) and the other column identifies a single value within the set of values; (vi) populating a row within the separate table for each value in each set of values within each row by appropriately filling in the primary key (from the original table) and the values among the set of values; (vii) modifying the metadata for the original column containing the sets of the values to point to the new table; (viii) when producing a visualization/query containing such a data item, joining data terms, and constructing the appropriate query for the data item; and (ix) presenting the visualization to the user.

The applications of the methods and systems, as enabled by analytics module 115, lead to the following: (i) determinations on whether to treat individual values as sets in the original dataset; (ii) sets of values to be projected as individual values in a query result; and (iii) a determination on whether to utilize techniques to model the data by applying a join.

Figure 2:
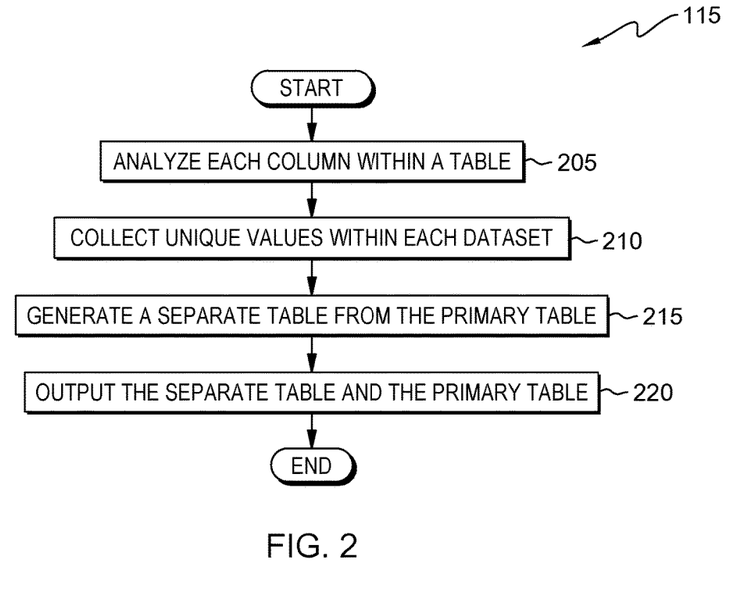
FIG. 2 is a flowchart depicting the operational steps to consume and utilize sets of values in columns of a table, in accordance with an embodiment of the present invention.

FIG. 2 is a flowchart depicting the operational steps to consume and utilize sets of values in columns of a table, in accordance with an embodiment of the present invention.

In step 205, analytics module 115 analyzes each column within a table. After parsing the sample of the rows within a dataset (e.g., the first 1000 rows), analytics module 115 determines if the text in the cells supports a pattern or trend during the consumption of the dataset. For example, the entries in the sample of the rows are grouped by a location. Furthermore, analytics module 115 ensures all of the entries in the sample for a corresponding column also supports the same pattern indicating a set of values. The determinations made by analytics module 115 are based on detecting common linguistic patterns and recognizing repeating values. Common patterns, such as comma separated lists, may be recognized by the linguistic parsers which suggest a list. The basic pattern (e.g., comma separation) is found in each cell of the column (or most) and is verified to further corroborate an initially determined pattern.

In step 210, analytics module 115 collects unique values within each dataset. Unique values refer to the individual values within the dataset. Using the collected sets of data, analytics module 115 splits apart the sets of collected data to obtain the unique values in each collected set of data. Analytics module 115 determines if there are a sufficient number of the values found in the sample of entries within columns which appear across a sufficient number of the collected set of entries within the columns analyzed in step 205. If a preset threshold (which quantifies the number of values found across a sample of entries) is exceeded, the sets of collected data are determined to be dispersed across the rows of the dataset. Thus, analytics module 115 ensures enough of the individual values in the sets of collected data are well represented across the rows of the dataset. If each value is unique or nearly unique, then analytics module assumes these values are not to be column containing sets. Treating these types of values as column containing sets provides little value to queries.

In step 215, analytics module 115 generates a separate table from the primary table. The primary table is the initial set of data on which analytics module 115 is applied on. The separate table contains two columns, for the individual values. The first column is a row identification from the primary table. The row identification may simply be the row number, or a primary key value. The second column is a single value from the dataset which appears at that row in the primary table. One entry for each value from the dataset must be associated at that row in the primary table. The column in the primary table is defined as a set type, and a reference to the new table is entered as the value in each cell. Other similar approaches at modelling a join operation may also be used.

In step 220, analytics module 115 outputs the separate table and the primary table. When projecting a data item on an axis of the visualization, a query may be written to join the separate table and the primary table to obtain the original values. Well known query techniques may be applied to obtain the original values. Analytics module 115 permits the end-user to consume and immediately gain insight from more complex, yet common, patterns of data which are available.

Figure 3:
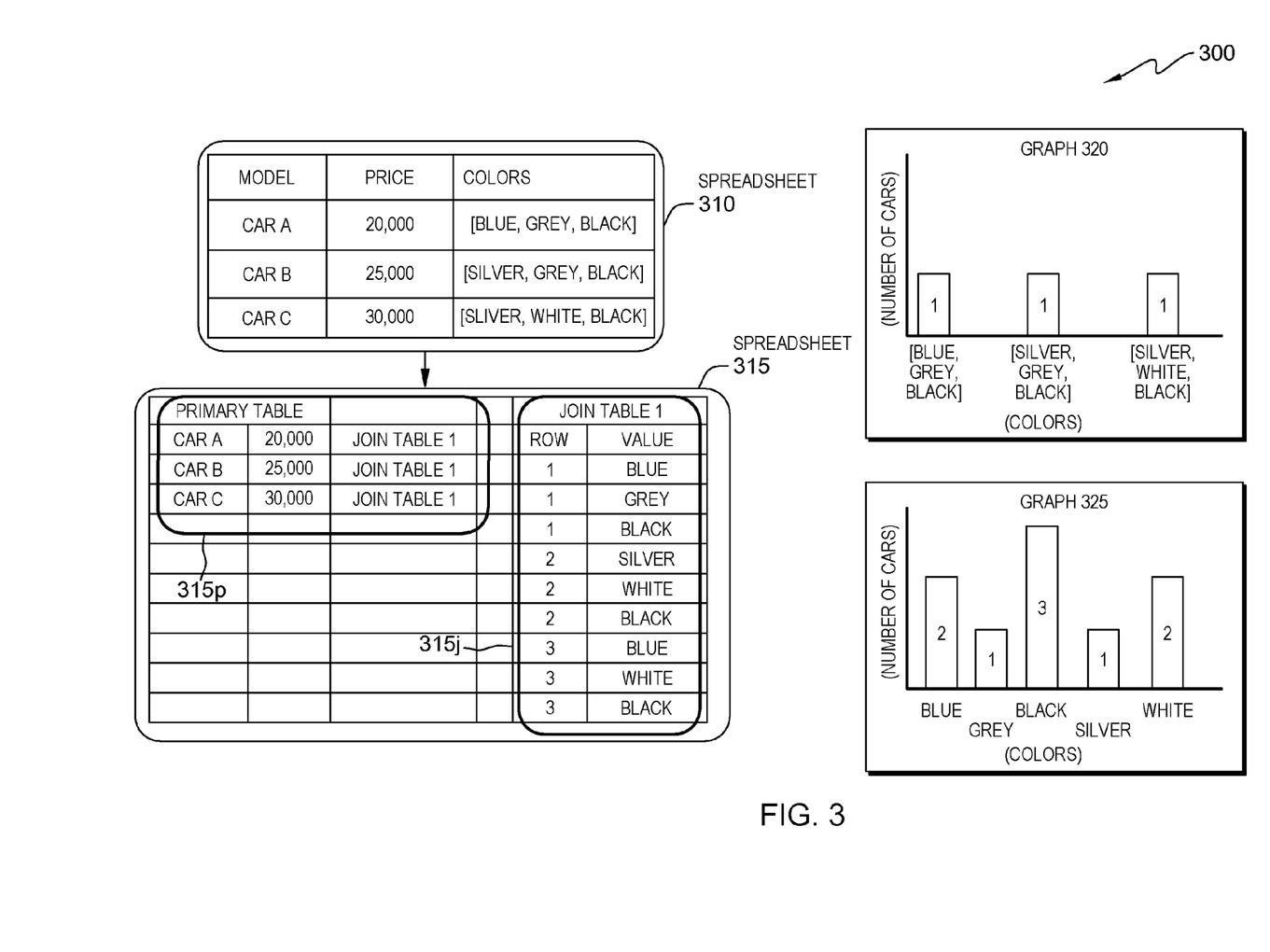
FIG. 3 is an example of original data which is visualized prior to and after applying an analytics module, in accordance with an embodiment of the present invention.

FIG. 3 is an example of original data which is visualized prior to and after applying an analytics module, in accordance with an embodiment of the present invention.

Analytics module 115 recognizes a set of values in a single cell within a dataset, and consume the dataset in a manner which allows the values within the set of values on an individual basis. The columns containing these cells have multiple values which are split into a separate table and joined back to the primary table at query time. In FIG. 3, spreadsheet 310 internally produces join table 315*j* after applying analytics module 115 on the data within spreadsheet 315. Spreadsheet 310 has a column titled "MODEL", "PRICE", and "COLORS". The entries for the "colors" column contains a set of three colors for each "MODEL" where "CAR A" can be in the "COLORS" of "[Blue, Grey, Black]", "CAR B" can be in the "COLORS" of "[Silver, Grey, Black]"; and "CAR C" can in the "COLORS" of "[Silver, White, Black]". The "PRICE" entries associated with "CAR A", "CAR B", and "CAR C" are "20,000", "25,000". and "30,000". respectively.

Graph 320 is the resulting visualization of the data within spreadsheet 310. Because data within spreadsheet 310 is not modelled in separate tables using analytics module 115, the color sets would be treated as atomic elements leading to a visualization resembling graph 320. The y-axis of graph 320 represents the number of cars and x-axis of graph 320 represents the "COLORS" column from spreadsheet 310. There are three bars in graph 320 where a single bar is associated with each x-value, wherein the x-values are: "[Blue, Grey, Black]", "[Silver, Grey, Black]"; and "[Silver, White, Black]".

If a visualization includes the joined column function (as enabled by analytics module 115) as depicted in primary table 315*p*. then the visualization/query produced is different from graph 320. A joined column is added to the visualization to internally generate spreadsheet 315 upon the application of the join functionality on spreadsheet 310 by analytics module 115. The data within spreadsheet 315 is modelled within two separate tables—primary table 315*p* and join table 315*j*. Queries can be constructed on the dataset within join table 315*j* which allows analytics module 115 to treat each of the values in the dataset within join table 315*j* as separate entities, while maintaining the integrity of the queries against the dataset. Thus, analytics module 115 allows operations to be performed on the values themselves, such as projections into a visualization, or aggregations of distinct counts of the individual values within join table 315*j*. The query performs the join and operates on join table 315*j*. For example, the end-user wants to plot the number of cars available in each color. The end-user invokes analytics module 115 on join table 315*j* in order to obtain a visualization the data within join table 315*j*.

Graph 325 is the resulting visualization of the data within join table 315*j*. Join table 315*j* contains information about cars within a column which describes the colors the cars are available in (i.e., the "VALUE" column in join table 315*j*). This may easily (and quite typically) be shown as a list of colors, for each car type (i.e., the "ROW" column in join table 315*j*), in the "VALUE" column of join table 315*j*. From this data, analytics module 115 allows an end-user to project the individual color values in a query and to count the number of cars available in each color, or the number of sales of each color for a particular car. The y-axis of graph 325 represents the number of cars and the x-axis of graph 325 represents the "COLORS" column within join table 315*j*.

The resulting visualizations on datasets as enabled by analytics module 115 may prove to be different from the resulting visualization on datasets not enabled by analytics module 115. For example, graph 325 has five bars (which results from utilizing analytics module 115) as opposed to graph 320 has three bars (which results without utilizing analytics module 115). Furthermore, graph 325 has different x-axis values from graph 320. The y-axis values associated with the x-axis values within graphs 325 and 320 are different from each other. In other words, the visualizations depicted in graph 325 and 320 are distinct traces from each other. There are five bars in graph 325 where a single bar is associated with each x-values, wherein the x-values are: "Blue", "Grey", "Black", "Silver", "Grey", and "White". Based on the values of y-axis of graph 325, there are: 2 "Blue" cars, 1 "Grey" car, 3 "Black" cars, 1 "Silver" car, and 2 "White" cars. Based on the values of the y-axis of graph 320, there are: 1 "[Blue, Grey, Black]" car, 1 ["Silver, Grey, Black"] car, and 1 ["Silver, White, Black"] car.

Analytics module 115 allows the proper use of faceting (i.e., focusing) on individual values within the dataset, rather than on the whole dataset. This is not possible if the individual values of the datasets could not be separated and queried against (as in the case of data values in spreadsheet 315). Analytics module 115 preserves the original integrity of the data when the columns are not included in the query, ensuring that the numbers are not double counted for each color the cars are available in.

Figure 4:
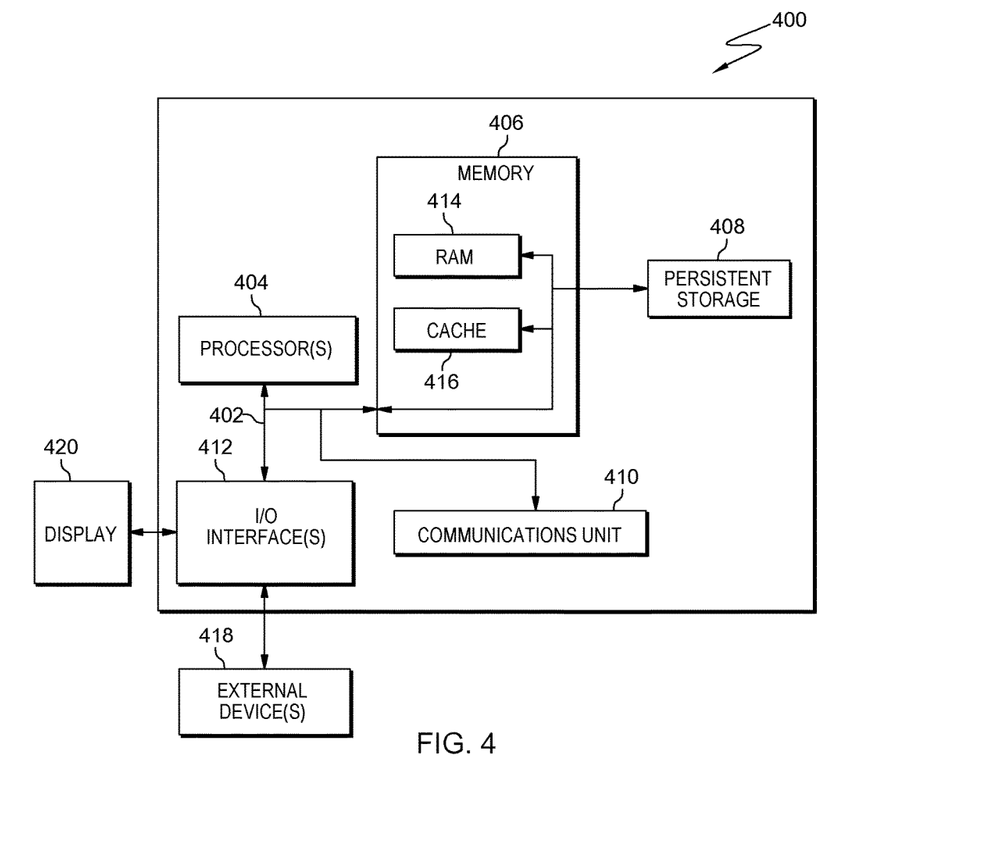
FIG. 4 depicts a block diagram of internal and external components of a computing device, in accordance with an embodiment of the present invention.

FIG. 4 depicts a block diagram of internal and external components of computer system 400, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides for communications between one or more processors 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media. Software (e.g., modeling program, travel optimization program, etc.) is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to a computing device through communications unit 410 (e.g., via the Internet, a local area network or other wide area network). From communications unit 410, the software and data can be loaded onto persistent storage 408.

One or more I/O interfaces 412 allow for input and output of data with other devices that may be connected to computer system 400. For example, I/O interface 412 can provide a connection to one or more external devices 418 such as a keyboard, computer mouse, touch screen, virtual keyboard, touch pad, pointing device, or other human interface devices. External devices 418 can also include portable computer-readable storage media such as, for example, thumb drives, portable optical or magnetic disks, and memory cards. I/O interface 412 also connects to display 420.

Display 420 provides a mechanism to display data to a user and can be, for example, a computer monitor. Display 420 can also be an incorporated display and may function as a touch screen, such as a built-in display of a tablet computer.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for visualizing and querying data, the method comprising:
   extracting, by one or more processors, a first set of data from a plurality of data within a first table;
   determining, by one or more processors, a set of patterns within the first set of data, wherein the set of patterns are based at least in part on common linguistic patterns across entries in the first set of data;
   identifying, by one or more processors, a second set of data, wherein the second set of data comprises values fitting a common linguistic pattern across a set of values associated with the first set of data within the first table, wherein identifying the second set of data, comprises:
   extracting, by one or more processors, unique values from the set of values associated with the first set of data within the first table;
   generating, by one or more processors, a second table upon extracting the unique values; and responsive to exceeding a preset threshold which quantifies a level of dispersion of the unique values across the second set of data, determining, by one or more processors, if the unique values are populated across the second table;
   generating, by one or more processors, the second table based on the first set of data and the second set of data; and
   outputting, by one or more processors, a visualization using columns, based on an analysis of the second table.

2. The method of claim 1, further comprising wherein extracting the first set of data from the plurality of data within the first table, comprises:
   determining, by one or more processors, a set of trends within the first set of data, wherein the set of trends are based at least in part on repeating values between entries in the first set of data; and
   parsing, by one or more processors, the first set of data for repeating values and data formats in order to corroborate the set of patterns and trends.

3. The method of claim 1, wherein the second table comprises:
   two columns, wherein a first column is an identifier for the first table and a second column is a single value from values in the second table, which occurs in a row in the first table.

4. The method of claim 3, further comprises:
   joining, by one or more processors, a plurality of data of the second table;
   responsive to joining the plurality of data of the second table, reformatting, by one or more processors, rows and columns of the first table; and
   incorporating, by one or more processors, the reformatted rows and columns of the first table, within the second table.

5. The method of claim 4, further comprises:
   performing, by one or more processors, queries on the reformatted rows and columns within the second table; and
   performing, by one or more processors, at least one of: visualization of the reformatted rows and columns within the second table and aggregation of the values of the reformatted rows and columns within the second table.

6. The method of claim 5, wherein the values on the reformatted rows and columns within the second table are treated as individual entities, in order to perform a plurality of data manipulation operations on the individual entities.

7. The method of claim 1, wherein common linguistic pattern is a comma separation in entries of the first set of data.

8. A computer program product for visualizing and querying data, the computer program product comprising:
   a computer readable storage medium and program instructions stored on the computer readable storage medium, the program instructions comprising:
   program instructions to extract a first set of data from a plurality of data within a first table;
   program instructions to determine a set of patterns within the first set of data, wherein the set of patterns are based at least in part on common linguistic patterns across entries in the first set of data;
   program instructions to identify a second set of data, wherein the second set of data comprises values fitting a common linguistic pattern across a set of values associated with the first set of data within the first table, wherein program instructions to identify the second set of data, comprises:

program instructions to extract unique values from the set of values associated with the first set of data within the first table;

program instructions to generate a second table upon extracting the unique values; and responsive to exceeding a preset threshold which quantifies a level of dispersion of the unique values across the second set of data, program instruction to determine if the unique values are populated across the second table;

program instructions to generate the second table based on the first set of data and the second set of data; and program instructions to output a visualization using columns, based on an analysis of the second table.

9. The computer program product of claim 8, further comprising:

program instructions to determine a set of trends within the first set of data, wherein the set of trends are based at least in part on repeating values between entries in the first set of data; and program instructions to parse the first set of data for repeating values and data formats in order to corroborate the set of patterns and trends.

10. The computer program product of claim 8, wherein the second table comprises:

two columns, wherein a first column is an identifier for the first table and a second column is a single value from values in the second table, which occurs in a row in the first table.

11. The computer program product of claim 10, further comprises:

program instructions to join a plurality of data of the second table;

responsive to joining the plurality of data of the second table, program instructions to reformat rows and columns of the first table; and program instructions to incorporate the reformatted rows and columns of the first table, within the second table.

12. The computer program product of claim 11, further comprises:

program instructions to perform queries on the reformatted rows and columns within the second table; and program instructions to perform at least one of: visualization of the reformatted rows and columns within the second table and aggregation of the values of the reformatted rows and columns within the second table.

13. The computer program product of claim 12, wherein the values on the reformatted rows and columns within the second table are treated as individual entities, in order to perform a plurality of data manipulation operations on the individual entities.

14. A computer system for visualizing and querying data, the computer system comprising:

one or more computer processors;

one or more computer readable storage media;

program instructions stored on the one or more computer readable storage medium, the program instructions comprising:

program instructions to extract a first set of data from a plurality of data within a first table;

program instructions to determine a set of patterns within the first set of data, wherein the set of patterns are based at least in part on common linguistic patterns across entries in the first set of data;

program instructions to identify a second set of data, wherein the second set of data comprises values fitting a common linguistic pattern across a set of values associated with the first set of data within the first table, wherein program instructions to identify the second set of data, comprises:

program instructions to extract unique values from the set of values associated with the first set of data within the first table;

program instructions to generate a second table upon extracting the unique values; and responsive to exceeding a preset threshold which quantifies a level of dispersion of the unique values across the second set of data, program instructions to determine if the unique values are populated across the second table;

program instructions to generate the second table based on the first set of data and the second set of data; and program instructions to output a visualization using columns, based on an analysis of the second table.

15. The computer system of claim 14, further comprising:

program instructions to determine a set of trends within the first set of data, wherein the set of trends are based at least in part on repeating values between entries in the first set of data; and program instructions to parse the first set of data for repeating values and data formats in order to corroborate the set of patterns and trends.

16. The computer system of claim 14, wherein the second table comprises:

two columns, wherein a first column is an identifier for the first table and a second column is a single value from values in the second table, which occurs in a row in the first table.

17. The computer system of claim 16, further comprises:

program instructions to join a plurality of data of the second table;

responsive to joining the plurality of data of the second table, program instructions to reformat rows and columns of the first table; and program instructions to incorporate the reformatted rows and columns of the first table, within the second table.

* * * * *